United States Patent [19]

Klop

[11] Patent Number: 5,435,335
[45] Date of Patent: Jul. 25, 1995

[54] OVERFLOW VALVE

[75] Inventor: Elmer P. Klop, Grand Haven, Mich.

[73] Assignee: EBW, Inc., Muskegon, Mich.

[21] Appl. No.: 261,838

[22] Filed: Jun. 17, 1994

[51] Int. Cl.[6] .................................................. F16K 31/22
[52] U.S. Cl. ..................................... 137/202; 137/433
[58] Field of Search ..................... 137/202, 409, 433; 73/322.5, 319; 222/69

[56] References Cited

U.S. PATENT DOCUMENTS

| | | |
|---|---|---|
| 1,454,971 | 5/1923 | Love . |
| 1,621,699 | 3/1927 | Wilhelm ............................. 137/409 |
| 2,325,674 | 8/1943 | Gustafson . |
| 2,388,481 | 11/1945 | Green . |
| 2,574,151 | 11/1951 | Laidley . |
| 3,563,263 | 2/1971 | Benson . |
| 3,736,950 | 6/1973 | Smallwood . |
| 3,770,001 | 11/1973 | Davis ............................ 137/202 X |
| 3,771,566 | 11/1973 | McMath . |
| 3,908,718 | 9/1975 | Bower . |
| 3,926,231 | 12/1975 | Madden . |
| 3,958,591 | 5/1976 | Hansel . |
| 4,036,255 | 7/1977 | Wilson . |
| 4,094,346 | 6/1978 | Milo . |
| 4,592,386 | 6/1986 | Mooney . |
| 4,721,283 | 1/1988 | Wilson . |
| 4,785,484 | 11/1988 | Sargent ........................... 137/202 X |
| 4,981,154 | 1/1991 | Bailey . |
| 5,019,141 | 5/1991 | Granville . |

FOREIGN PATENT DOCUMENTS 197810 10/1978 United Kingdom ............... 137/202

*Primary Examiner*—Stephen M. Hepperle
*Assistant Examiner*—Kevin L. Lee
*Attorney, Agent, or Firm*—Basile and Hanlon

[57] ABSTRACT

An overflow valve for use in a vapor return line of a vapor recovery system for underground storage fuel tanks. The overflow valve is threadably attached in a main vapor line and communicating with an individual storage fuel tank. A plurality of fingers located around an inner edge of a valve chamber disposed within the overflow valve provide a seat for a spherical float, designed to provide a maximum surface area of the float to be in contact with fluid from an individual storage tank, to provide quick response with which the float moves up and down in the chamber and permitting uninhibited flow of liquid under the float when the float is rising.

5 Claims, 2 Drawing Sheets

OVERFLOW VALVE

FIELD OF THE INVENTION

The invention relates to an overflow valve for underground storage tanks wherein the storage tanks have a common vent line.

BACKGROUND OF THE INVENTION

Conventionally, a plurality of storage tanks at service stations or similar locations are buried underground in a side by side arrangement. For environmental purposes, a vapor recovery system fitted to delivery tank trucks is generally used in conjunction with the filling of the storage tanks wherein a common vent line is connected to each storage tank. One end of the common vent line is adaptable for connection to a fuel truck. Each tank has its own separate vent leading to the common vent line. In a multiple tank arrangement with a common vent line, it is very important that the gasoline or other liquid fluid from one tank does not escape into the common vent line and thereby contaminate an adjacent tank. Therefore, it is desirable to have a valve for each fuel tank which is normally open to permit the passage of vapor, but closed to prevent passage of liquid fuel therethrough. It is further desirable to have a valve that is not complex. In addition, it is desirable to have a valve that responds quickly to the rise of liquid fuel within the valve.

Therefore, it is an object of this invention to provide an overflow valve which addresses these aforementioned concerns.

SUMMARY OF THE INVENTION

The invention comprises a vent overflow valve that threadably engages into the common vent line of the vapor recovery system at one end and engages with an individual vent line from a storage tank at a distal end.

The vent overflow valve comprises a valve body having a lower fluid chamber and an upper float chamber formed therein. The vent overflow valve has a float movably disposed within the upper float chamber to prevent liquid fluid escaping into the common vent line. The upper float chamber opens to a main vent adapter that communicates with the common vent line, and has a reduced port therebetween. Disposed between the lower fluid chamber and the upper float chamber is a float seat. The float seat is essentially four prongs or fingers extending from an annular upper ledge in the lower fluid chamber. A spherical float located in the upper float chamber rests upon the four prongs when there is no liquid fluid in the upper float chamber. An entire bottom-most surface area of the float is directly exposed to fluid flow. When the spherical float is laying against the four prongs, vapor can flow around the spherical float between adjacent prongs. All vapor from the fuel storage tanks entering the upper float chamber of the overflow valve must pass around the four prongs and the spherical float. As a result of this configuration, all fluid passes around the prongs and spherical float to result in a quicker response time of the spherical float. If liquid fluid enters the upper float chamber, the spherical float is raised by the liquid. If the float is raised to the reduced port, the float will block the port and prevent liquid fluid from entering into the common vent line.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
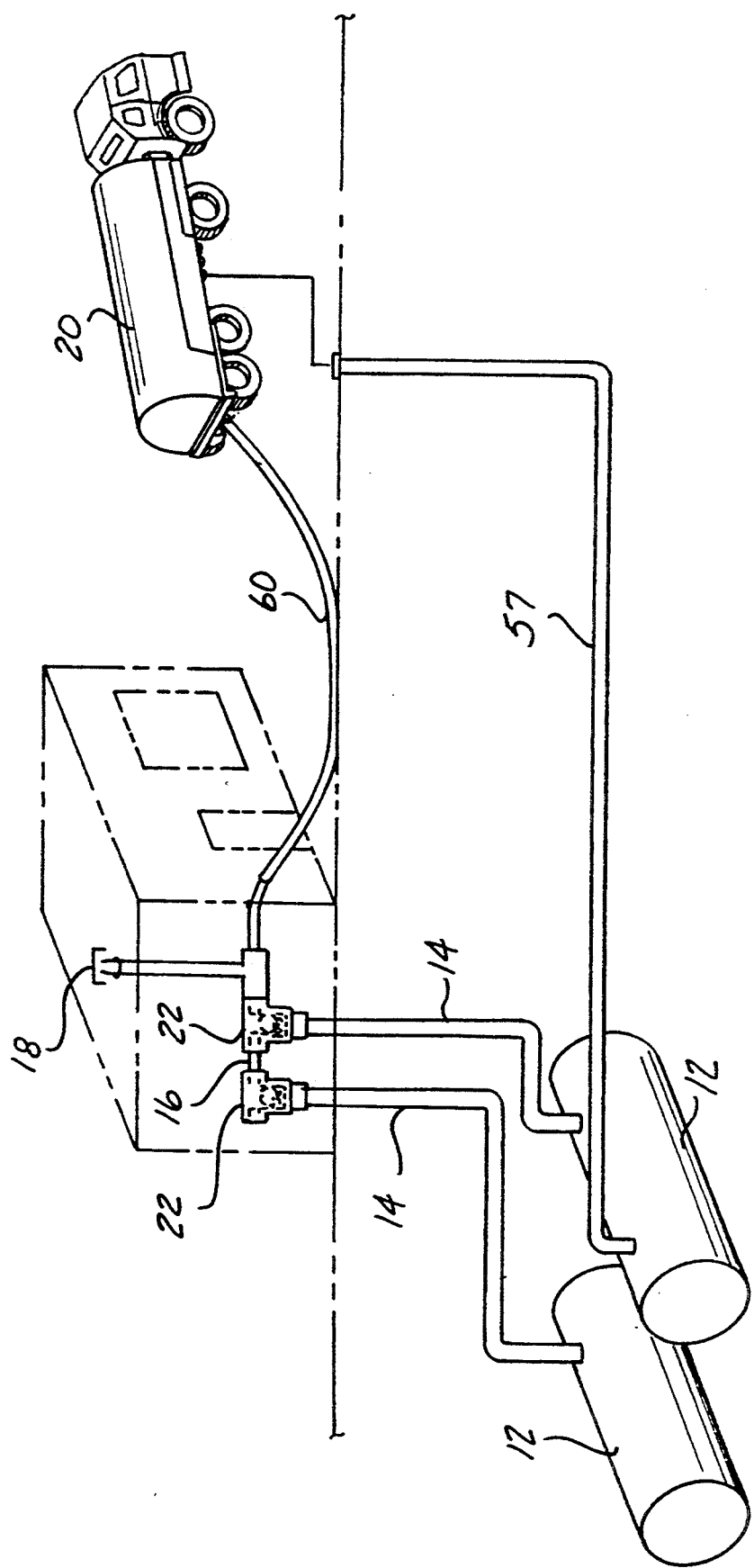
FIG. 1 is a schematic view of a vapor recovery system for underground storage tanks employing overflow valves of the current invention.

As seen in FIG. 1, a vapor recovery system 10 generally includes a plurality of underground fuel storage tanks 12 each having a vent line 14 in communication with a common vent line 16. The common vent line 16 may be open to atmosphere as in through a man cover or vent 18 at one end; and have an access 19 to a fuel truck 20 at the same or other end. An overflow valve 22, according to the embodiment of the present invention, is installed at the location where the common vent line 16 meets the vent line 14 for an individual storage tank 12.

Figure 2:
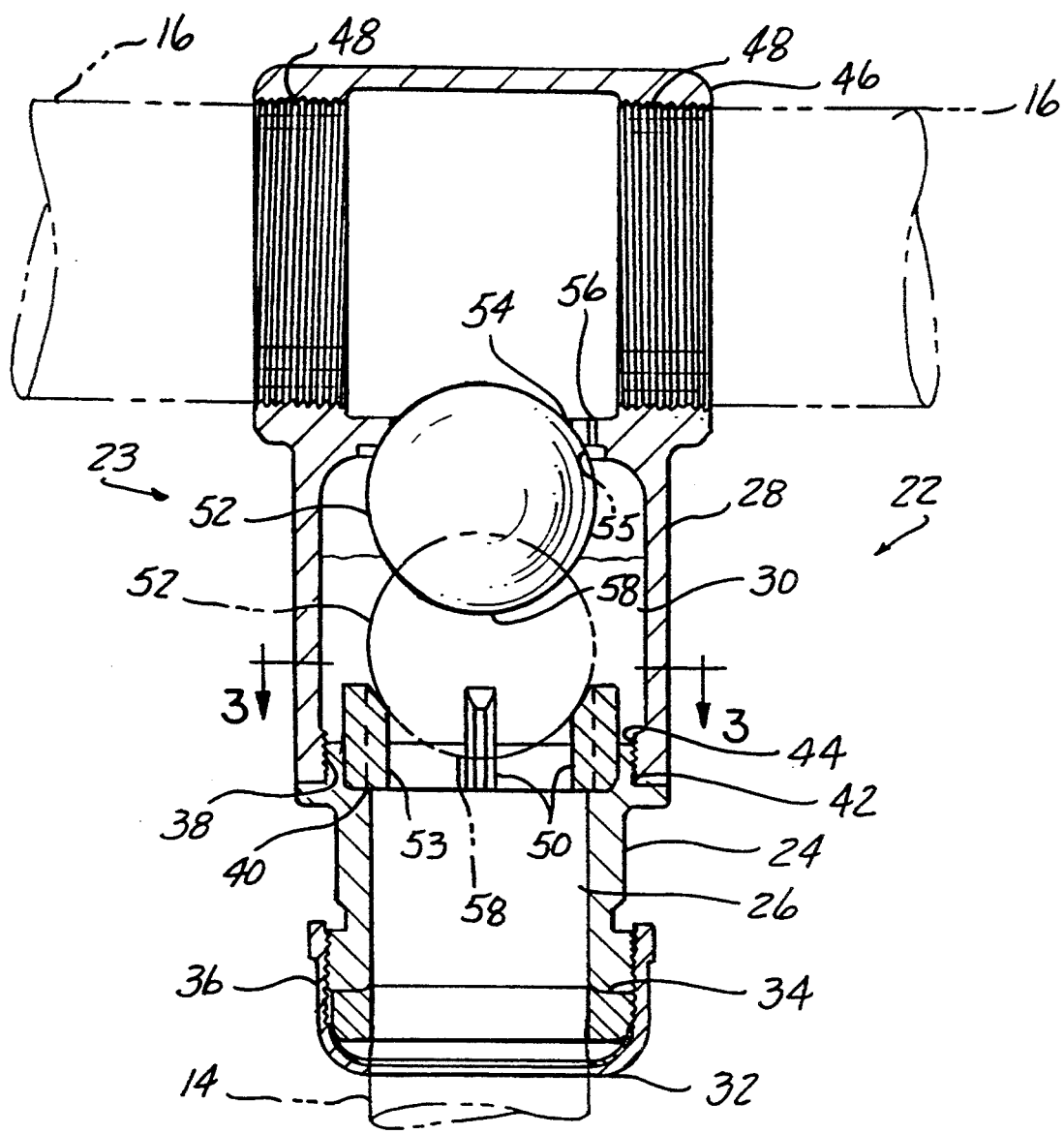
FIG. 2 is a detailed elevation view of the overflow valve.
Figure 3:
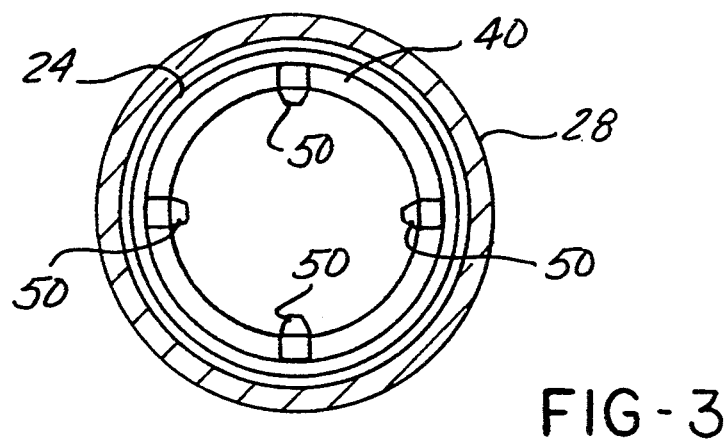
FIG. 3 is a sectional view taken along lines 3—3 of FIG. 2.

Looking at FIG. 2, the overflow valve 22 of the present invention comprises a valve housing 23 having two body portions threadably connected; a first body 24 housing a lower fluid chamber 26 and a second body 28 housing an upper float chamber 30 formed therein. The vent line 14 from an individual storage tank enters the overflow valve 22 housing at a lower end 32 and connected thereto by a gasket 34 and compression ring 36 to provide fluid flow into the lower fluid chamber 26. At an end distal from the compression ring 36, the lower fluid chamber body 24 has an external threaded region 38 and an internal annular ledge 40. The upper float chamber body 28 has one end 42 having an internally threaded portion 44 to threadably attach to an external threaded region 38 of the lower fluid chamber body 24. At a distal end, the upper float chamber body 28 has a main vent adapter 46 having lateral internal threaded portions 48 for threadably attaching into the common vent line 16.

Four prongs or fingers 50 are equidistantly spaced around the annular ledge 40 of the lower fluid chamber 26 and extend into the upper float chamber 30. The fingers 50 provide a seat for a spherical float 52 or ball, and prevent the float 52 from blocking a fluid passage 53 between the lower fluid chamber 26 and the upper float chamber 30. Vapor is capable of entering the upper float chamber 30 by the passage 53 around the spherical float 52 and between the adjacent prongs 50.

To aid in the ease with which float 52 moves up and down, and to improve the response of the float 52 to move from the pronged seat when liquid fluid enters the upper float chamber 30, it is an important feature to provide uninhibited flow of liquid under the float 52 and in contact with float 52 when on the pronged seat 50. The pronged seat 50 is designed so that when the spherical float 52 is at rest on seat 50, an entire bottom-most surface area 58 of float 52 is directly exposed to fluid flow. The pronged seat 50 partially elevates float 52 so that vapor fluid can enter the upper float chamber 30 between prongs 50 and ultimately, the common vent line 16. In addition, the prong seat 50 elevates float 52 to increase the bottom-most surface area 58 of the float 52 exposed to fluid flow. The preferred float 52 is constructed to float in liquid fluid and to remain seated on the pronged seat 50 in the presence of vapor fluid.

At an end distal from the seat 50 in the upper float chamber 30 is a gas outlet 54 leading to the main vent adapter 46. The gas outlet 54 is sized so that in a condition where the spherical float 52 reaches an uppermost extent of travel, float 52 will settle against the gas outlet seat 55 and prevent liquid fluid from passing through the outlet 54 and into the common vent line 16. (FIG. 2 shows float 52 settled against the gas outlet seat 55, and in phantom, float 52 is on pronged seat 50). Suitable means such as a bleed aperture 56 is provided on the side of gas outlet 54 to permit fumes or vapors to be vented from the tank 12 even though the spherical float 52 is engaging the seat 55 of the gas outlet 54.

When filling a storage tank 12, fuel enters tank 12 from the fuel tank 20 through a suitable entry means 57. Hydrocarbon vapor then flows through the vent line 14, overflow valve 22, the gas outlet 54 of the upper float chamber into the main vent adapter 46, and then through the common vent line 16 and hose 60 leading to tank truck 20. If liquid reaches the upper float chamber 30 of the overflow valve 22, for example when tanks 12 are overfilled, the float 52 starts to respond and rise when the liquid flows past the seat 50. The float engages the outlet seat 55 and blocks the gas outlet 54 when the liquid level rises high enough. Thereby liquid fluid is prevented from contaminating adjacent fuel storage tanks.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An overflow valve connectible to a common vapor line of a vapor recovery system for underground fuel tanks to provide a fluid flow path from the fuel tank to the vapor recovery system, said overflow valve comprising:
    a first end communicating to a fuel tank and a distal end releasably attached to the common vapor line with a fluid chamber disposed therebetween, said chamber having an annular ledge and a port to the common vent line;
    a seat comprising a plurality of prongs along the annular ledge of the fluid chamber; and
    a spherical float disposed within the chamber between the seat and the port and located in the fluid flow path, wherein said float is responsive to liquid fluid flowing between the prongs and into the chamber whereby the float seats against the port to prevent liquid passing therethrough.

2. An overflow valve connectible to a common vapor line of a vapor recovery system for underground fuel tanks to provide a fluid flow path from the fuel tank to the vapor recovery system, said overflow valve comprising:
    a first body housing a lower fluid chamber and having an inlet communicating with a fuel tank;
    a second body housing an upper float chamber and a main vent adapter, said main vent adapter having internally threaded portions to threadably attach to the common line;
    a passageway communicating the lower fluid chamber to the upper float chamber;
    an annular seat located in the fluid flow path proximate to the passageway; and
    a spherical float disposed in the upper float chamber in the fluid flow path between the annular seat and the main vent adapter wherein said annular seat permits uninhibited flow of liquid under the float.

3. The overflow valve of claim 2, wherein the annular seat comprises a plurality of fingers that extend into the upper float chamber to elevate the float to upper portions of said fingers above the annular seat to increase the surface area of the float exposed to fluid flow.

4. The overflow valve of claim 3, wherein said overflow valve has a gas outlet leading from the upper float chamber to the main vent adapter and a bleed aperture.

5. The overflow valve of claim 4, wherein said overflow valve comprises a connecting means to connect said overflow valve to a vent from the fuel tank, said connecting means comprising a gasket and compression ring.

* * * * *